United States Patent Office 3,247,282
Patented Apr. 19, 1966

3,247,282
COPOLYMERS OF DIALLYLIDENE PENTAERYTH-
RITOL WITH HYDROXYL TERMINATED UN-
SATURATED ESTERS AND VINYL MONOMERS
Alfred Englisch, Bergisch-Neukirchen, and Rolf Zimmermann, Wiesbaden-Biebrich, Germany, assignors to Chemische Werke Albert, Wiesbaden-Biebrich, Germany, a corporation of Germany
No Drawing. Filed Aug. 23, 1961, Ser. No. 134,027
Claims priority, application Germany, Aug. 25, 1960,
C 22,211; Sept. 9, 1960, C 22,313
14 Claims. (Cl. 260—827)

This application is a continuation-in-part of application Serial No. 20,825, filed April 8, 1960.

This invention relates to a new type of synthetic resin poylmers and their production. The chemical and physical characteristics of these new resins make them especially well adapted for the production of cast resins.

It is known that unsaturated acetals such, for instance, as obtained from glycol and acrolein can add on monohydric or polyhydric alcohols whereby ether or polyether cycloacetals are formed. It is further known that on this basis, for instance, by the conversion of acrolein with polyhydric alcohols, especially pentaerythritol, synthetic resins are formed in the presence of certain catalysts. In this latter instance, as an intermediate stage, mono and diallylidene acetals develop which, with further still free OH— groups, form polyether cycloacetals. Similar compounds are obtained if preformed twice or thrice unsaturated acetals are converted with polyhydric alcohols (H. Orth, Uber neuere Polyaddukte and ihre technischen Anwendungsmöglichkeiten, Kunststoffe 41, 454–457, 1951).

It has now been found that glass-like, colorless, or slightly colored, infusible resins with good chemical and physical characteristics are obtained when esters which have been obtained from an ethylenically unsaturated dicarboxylic acid, if desired in admixture with up to 50 mol percent of saturated dicarboxylic acids, and polyhydric saturated alcohols and which still contain free excess alcoholic hydroxyl groups, are added to diallylidene pentaerythritol and the resulting polyadducts are copolymerized with a polymerizable monomer having the group >C=CH$_2$ and containing from 3 to 16 carbon atoms under catalytic influence, preferably in the presence of one or more polymerization catalysts. The term "saturated dicarboxylic acids" has reference herein to dicarboxylic acids free of functional unsaturation and includes such acids containing an aromatic nucleus but includes no other type of unsaturation. The term "free excess alcoholic hydroxyl groups" means that the ester contains more free alcoholic hydroxyl groups than carboxyl groups.

Diallylidene pentaerythritol is a known compound and is considered to have the following formula:

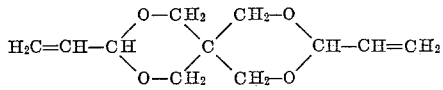

In the production of the esters of dicarboxylic acids, containing on an average per molecule more than one free alcoholic hydroxy group, saturated aliphatic polyhydric alcohols are preferably used in the esterification. These alcohols may be reacted with dicarboxylic acids in a known manner by reacting the dicarboxylic acid with more than one equivalent, generally at least 1.1 and preferably between 1.2 and 1.5 equivalents of the polyhydric alcohol. For example, 2 or even more equivalents of the polyhydric alcohol may be used per equivalent of the dicarboxylic acid. In most cases the esters so produced are mixtures of monomeric and oligomeric esters and have an acid number between 5 and 50 and a hydroxyl number between 200 and 350. Preferably the acid number is in the range from 10 to 30 and the hydroxyl number is in the range from 250 to 300.

A variety of polyhydric alcohols may be used to form the esters but among the suitable saturated aliphatic polyhydric alcohols the low molecular polyhydric alkanols and polyhydric alkanol ethers derived therefrom are preferred. Typically such compounds contain not more than 6–10 carbon atoms and include such polyhydric compounds as ethylene gylcol, diethylene glycol, triethylene glycol, 1,2-propylene glycol, 1,3-propanediol, the various butane-, pentane- or hexanediols such as 2,2-dimethylpropanediol-1,3,2-ethyl-2-butylpropanediol - 1,3, glycerol, trimethylol ethane, trimethylol propane and the like. Also, mixtures of various compounds may be used.

Suitable ethylenically unsaturated dicarboxylic acids are preferable the $\alpha,\beta$-unsaturated dicarboxylic acids, or the ethylene $\alpha,\beta$-dicarboxylic acids. Among the more practicable the following are representative: maleic acid, fumaric acid, itaconic acid, citraconic acid, mesaconic acid and the like.

Suitable saturated dicarboxylic acids are, e.g., succinic, glutaric, adipic, pimelic, agelaic, sebacic, ortho-, iso- or terephthalic acid or the hexahydrogenation products thereof, endomethylenehexahydrophthalic or tetrachlorosuccinic acid; the various tri- or tetrachlorophthalic acids and the like. If chlorine-containing acids constitute an acid component, they may be adjusted in such an amount that the final resin is not combustible. On the other hand, the polymerization is not impaired by the presence of the saturated dicarboxylic acids. Furthermore, mixtures of several unsaturated and/or saturated carboxylic acids may be used.

It will be seen that when the above noted polyhydric alcohols are reacted with the above noted $\alpha,\beta$-unsaturated dicarboxylic acids in the stated molar proportions, the esters will always contain on an average per molecule, more than one free and reactive alcoholic hydroxy group.

In the formation of the polyadducts with the above noted esters of the $\alpha,\beta$-unsaturated dicarboxylic acids, the esters may be used together with polyhydric alcohols such as ethylene glycol, diethylene glycol, triethylene glycol, trimethylol propane, 4,4'-(dihydroxycyclohexyl)-propane-2,2 or the other above-mentioned polyhydric alcohols or with polynuclear diphenols, preferably p,p'-dihydroxydiphenyl propane or its dihydroxyethyl ether. Normally these polyhydric compounds are used in a minor proportion relative to the weight of the ester containing the free alcoholic hydroxy group.

The formation of the polyadducts hereof may be activated by the presence of catalytic amounts, e.g., about 0.01 to 4, suitably 0.25 to 2 mol percent, calculated on the total amount of the reactants, of boron trifluoride etherate or of inorganic or organic acids. Suitable acids, for instance, include phosphoric acid, sulfuric acid, p-toluene sulfonic acid, glacial acetic acid, halogeno-acetic acids, such as mono-chloro or -bromo-, dichloro- or trichloro-acetic acid or so-called Lewis acids such as aluminum chloride, tin tetrachloride, boron trifluoride and the like. However the use of boron trifluoride etherate is most preferred. Usually reaction will take place by merely mixing the reactants with the catalyst at room temperature and a temperature between 20 and 110° C. is customarily used. Temperatures of 50–70° C. are preferred.

The character of the resins produced is dependent upon the type and concentration of the catalyst as well as upon the temperature used and time of the reaction. Valuable polyadducts have been obtained when using from about 0.3 to about 3 mols, preferably from 0.5 to 2 mols, of ester per mol of diallylidene pentaerythritol.

The polyadducts obtained in the first stage of the reaction are capable of further reaction with polymerizable α-substituted ethylene compounds to form copolymers which have properties rendering them especially useful for the formation of laminations and cast resins and for use as adhesives. Suitable polymerizable α-substituted ethylene compounds have been described in various patents, e.g., 2,844,559, 2,843,556 and the patents referred to therein. They include for instance vinyl compounds such as vinyl toluol, vinyl pyrrolidone, styrene, α-methyl styrene, chlorostyrene, divinylbenzene, vinyl acetate, vinyl propionate, allyl acetate, allyl propionate, diallyl maleate, fumarate, succinate, adipate, azelaic sebacate, or phthalate, triallylphosphate, methyl, ethyl, propyl or butyl (primary, secondary, tertiary or iso), amyl, hexyl or octyl acrylate or methacrylate, diallylitaconate, acrylonitrile, or a mixture of such monomers. Accordingly the preferred monomers are compounds containing the group >C=CH$_2$ bound to a negative radical, such as a benzene nucleus, the ester group

or a nitrile group. Suitably these compounds contain no conjugated olefinic bonds. In general, normally liquid polymerizable vinyl and vinylidene monomers are preferred. By using these liquid monomers, solutions or liquid dispersions of the polyadduct resin can be formed which are especially well adapted for use in the above noted applications.

The quantity of the ethylene monomer used can be varied in accordance with the intended use; 30 to 50% based on the weight of the resin solution have been found to constitute a favorable proportion. Putting it another way, the weight ratio of the polyadduct to the polymerizable α-substituted ethylene compound has been found to be quite satisfactory between about 2.3:1 and 1:1 Of course, the amount of α-substituted ethylene compound needed will be dependent upon the phase that the adduct has reached at the time of its dispersion in the polymerizable α-substituted compound.

In the beginning of the reaction between the ester and the diallylidene pentaerythritol, the miscibility of the adduct increases as the addition advances but the OH— number of the adduct should be preferably maintained less than 100. However if the addition progresses too far, the solubility, or miscibility, of the adduct with the polymerizable α-substituted ethylene compound begins to decline.

It has been found that the solution of the adducts hereof in suitable α-substituted ethylene compound is lacking in stability and stability is a very desirable property for the preferred fields of use. The addition of conventional stabilizers against gelling such as anti-oxidants of the type of hydroquinone or phenolic compounds have not, in many instances, been capable of preventing gelling. On the other hand, it has surprisingly been found that the addition of basic substances will very effectively stabilize the solution. The stabilizer is preferably used in an amount which is at least equivalent to that of the acid catalyst, or, in other words, in an amount of, e.g., 0.01 to about 4 percent, preferably about 0.1 to about 2 percent, calculated on the weight of the components from which the adduct is prepared. The composition containing appropriate amounts of the basic substances remains stable for many months and in many instances no changes are noticeable after six months. In the absence of these basic reacting stabilizers, frequently the polyadducts dissolved in styrene, for instance, will gel in two to four hours. The presence of these basic substances does not reduce the effectiveness of known polymerization inhibitors such as substituted pyrocatechol, hydroquinone or the like. Surprisingly, and advantageously, these basic-reacting substances seem to have a brightening effect upon the formed resins and inhibit yellowing.

Suitable basic-reacting substances include, both organic and inorganic substances such as, for instance, alkali metal hydroxide, alkali metal alcoholate, alkali metal carbonates, alkaline earth metal hydroxides, organic bases such as piperidine, morpholine, ethylene diamine, pyrrolidine, or the like. As stated, they are preferably used in a quantity equivalent to the catalyst used. In this way, the products of addition can be stabilized and can thus be made suitable for their further processing.

After the dispersion of the polyadduct resin in the polymerizable α-substituted ethylene compound has been stabilized, the copolymerization may be induced by organic peroxides or any other catalyst heretofore found useful for the polymerization of the vinyl compound. Suitable peroxides include, for instance, benzoyl peroxide, 2,4-dichlorobenzoyl peroxide, acetyl peroxide, tert. butyl peroxide or hydroperoxide, succinyl peroxide, lauroyl peroxide, cyclohexyl hydroperoxide, cyclohexanone peroxide, methyl ethyl ketone peroxide, methyl isobutyl ketone peroxide, cumol hydroperoxide, 2,2-bis-(tert. butyl peroxy) butane, and, as well, also tert. butylperbenzoate and the like. Also conventional accelerators may be used together with the organic peroxides such as dimethyl aniline, cobalt octoate, lauryl mercaptan or similar substances. The copolymerization may be carried out at room or mildly elevated temperatures, e.g., between 10 and 150° C. or preferably between 20 and 80° C.

Generally speaking, the products produced in accordance with this invention are either completely clear, clear as water, or slightly yellowish or brownish in color. They are especially useful for the production of cast resins but are also well-suited for lamination of glass and textile fibers. Additionally, they constitute excellent lacquer resins and may be used in the production of adhesives. Those products which are prepared from esters of a mixture of α,β-ethylenically unsaturated carboxylic acids and saturated carboxylic acids have improved mechanical and electrical properties, e.g., a reduced surface resistance. Conventional inorganic fillers may be used in the production of molded resin products. Such fillers include asbestos, lime, chalk, ground glass and silicon carbide. Compatibility with the resin is good and organic dyestuffs or pigments may be added to impart desired esthetic characteristics. None of these additional agents disturb the copolymerization of the adducts with the polymerizable α-substituted ethylene monomer.

The resulting hardened resin products either as such or in the presence of fillers, extenders, coloring agents and the like have superior chemical stability particularly against the action of alkalis and acids.

We have furthermore found in extended experiments that the sensitivity of the aforementioned products towards oxygen can be very much reduced by adding to the α,β-unsaturated dicarboxylic acid ester and/or the diallylidene pentaerythritol a small amount, e.g., about 1 to about 25, preferably 5 to 15 percent by weight, of allyl alcohol. The percent figure is calculated on the sum of the dicarboxylic acid ester and the diallylidene pentaerythritol. In the absence of such an addition of allyl alcohol oxygen of the air may cause an incomplete polymerization at the surface of the resin. As a consequence, the surfaces of the cast resin and coatings are not sticking as hard, even and bright, as it is often desired, even if the polymerization is carried out at elevated temperatures. Contrary thereto, according to this embodiment of the invention, molded articles and coatings are obtained, which have excellent drying characteristics when exposed to the air, and which are characterized by an excellent hardness of the surface, and also of a permanent high gloss.

The addition products, thus obtained, are dissolved in α-substituted ethylene compounds and copolymerized in customary manner. Even very thin layers, i.e. layers which have a large surface on which oxygen may influence the polymerization, are polymerized at room temperature within a few hours to yield a nonsticking product with high gloss surface. This means that no air-inhibition occurs which is of great importance for the manufacturer; accordingly, no further processing is necessary. The untreated surfaces already excel through high scratch-resistance and high gloss. Although finishing is not required as a rule, the lacquer films can be, if desired, abraded and polished. For these reasons, the resins processed according to the invention qualify especially well as lacquer raw materials.

The resins of the invention can also be modified by an addition of one or more halosilanes to the polyadduct before the polymerization is carried out. Suitable halosilanes are e.g. methyldichlorosilane, dimethylchlorosilane, diphenyldichlorosilane, diethyldichlorosilane, methylphenyldichlorosilane, phenyltrichlorosilane, ethyltrichlorosilane, which are added in an amount of, for example, 1 to 25 percent, preferably 5 to 15 percent, calculated on the weight of the poly adduct. These silicium-containing resins have an improved resistance to heat and chemical agents and have also improved electrical properties.

An understanding of the invention will be facilitated by the following detailed and specific, but purely illustrative examples, in which all parts are expressed as parts by weight.

*Example 1*

53 parts of diallylidene pentaerythritol were dissolved in 51 parts of maleic acid diglycol ester (maleic acid bis-(ethylene glycol)ester) with 0.4 part of boron trifluoride etherate and heated for about five hours at 60° C. until the OH–number fell between 80 and 90. The slightly brown, clear resin was dissolved in 40 parts of styrene, mixed with 2 parts of a methyl ethyl ketone peroxide solution (40% in dimethylphthalate) and with 1 part of a cobalt octoate solution (1% cobalt content) and left standing at room temperature.

The solution gelled within 50 minutes and solified in 14 hours into a solid, water-clear mass. By an after-hardening at 80- C. for one hour, one obtains a hard, clear body.

*Example 2*

Forty-two (42) parts of diallylidene pentaerythritol, 61 parts maleic acid diglycol ester and 0.3 part p-toluene sulfonic acid were mixed together carefully and left standing for 2 days at room temperature. Three (3) parts of benzoyl peroxide (50% in phthalate softener) were dissolved in 50 parts of methacrylic acid methyl ester. The polyadduct resin was incorporated in this solution.

The resulting composition was cast in forms and then hardened for 5 hours at 70° C. A clear, slightly yellow-brown, hard-formed body was obtained.

*Example 3*

Forty-two (42) parts of diallylidene pentaerythritol and 26 parts of maleic acid diglycerol ester were stirred together. To the weakly turbid solution 0.35 part of boron trifluoride etherate was added and then the solution was heated for 8 hours to 60° C. Already, after a short heating, the turbidity disappeared and the mixture became gradually more viscous and slightly yellow. The resin thus obtained was dissolved in 35 parts of styrene, stirred with 3 parts cyclohexanone peroxide (50% in dimethylphthalate) and with 1 part of a cobalt octoate solution.

The resulting composition was cast in forms and polymerized at room temperature within 2 days into a clear, slightly yellow mass. By heating to 70° C. the time of hardening can be reduced to one hour.

*Example 4*

A mixture of 17 parts of maleic acid bis-(trimethylolpropane) ester (acid:hydroxy equivalent=1:1.5; acid number 10, OH— number 280 to 300), 21 parts of diallylidene pentaerythritol and 0.4 part of boron trifluoride etherate was stirred for 5 hours at 55 to 60° C. The viscous, slightly yellow-brown resin was dissolved in 30 parts styrene and after addition of 2 parts methyl ethyl ketone peroxide solution (40% in dimethylphthalate) and 1 part cobalt octoate solution left standing at 25° C.

The mass solidified after 2 hours and within 6 days it had hardened into clear, colorless, hard bodies.

*Example 5*

Fourteen (14) parts of maleic acid diglycol ester, 4 parts maleic acid diglycerol ester, 21 parts of diallylidene pentaerythritol and 0.16 part of boron trifluoride etherate were mixed together and heated for 8 hours to 70° C. The slightly yellow-brown, clear resin was dissolved in 20 parts styrene.

After the addition of 2 parts methyl ethyl ketone peroxide and 1 part cobalt octoate solution, the composition hardened in 4 days into a clear, slightly yellow mass.

*Example 6*

Thirty-two (32) parts of diallylidene pentaerythritol were dissolved in 24 parts of maleic acid diglycol ester and 9 parts of maleic acid diethylene glycol ester, mixed with 0.26 part boron trifluoride etherate and stirred for 8 hours at 60° C. Three (3) parts methyl ethyl ketone peroxide solution were stirred into 40 parts of styrene and the polyadduct resin was dissolved therein.

After the addition of 1 part cobalt octoate solution, it was cast in forms. The mass gelled within 50 minutes and hardened in 4 days into clear, colorless formed bodies.

*Example 7*

Thirty-two (32) parts of diallylidene pentaerythritol, 14 parts of p,p′-dihydroxydiphenylpropane dihydroxyethyl ether and 22 parts of maleic acid diglycol ester were stirred together and 0.35 part boron trifluoride etherate was added. Upon heating to 60° C. a slightly brown clear solution was formed. The mixture was held for 3 hours at this temperature and then dissolved in 30 parts of styrene.

Upon the addition of 2 parts of a methyl ethyl ketone peroxide solution and 1 part cobalt octoate solution to the styrene solution, slightly brown, clear castings were obtained.

*Example 8*

Twenty-five (25) parts of maleic acid diglycol ester, 7 parts of p,p′-dihydroxydiphenylpropane, 32 parts of diallylidene pentaerythritol and 0.25 part boron trifluoride etherate were mixed thoroughly together and heated for 4 hours to 60° C. Already after a short heating, a complete solution took place. The slightly brown resin which developed was dissolved in 38 parts of styrene and 3 parts of a methyl ethyl ketone peroxide solution.

After addition of 1 part cobalt octoate solution, the composition was cast in molds and left standing at 28° C. Clear, slightly brown castings were obtained after 48 hours.

*Example 9*

A mixture of 27 parts of diallylidene pentaerythritol, 25 parts of maleic acid diglycol ester, 5 parts of diethylene glycol and 0.24 part boron trifluoride etherate were heated for 6 hours to 70° C.

Fifty parts of the clear, almost colorless resin dissolved in 30 parts styrene, after mixing therewith 1.5 parts of cyclohexanone peroxide (50%) and 0.7 part of a cobalt octoate solution, hardened into glass-clear, colorless formed bodies.

Example 10

Fifty-three (53) parts of diallylidene pentaerythritol were thoroughly mixed with 51 parts of maleic acid diglycol ester and 0.2 part boron trifluoride and heated for 1 hour to 110° C. Sixty (60) parts of the brown resin so obtained were dissolved in 40 parts styrene and mixed with 2 parts methyl isobutyl ketone peroxide solution (80%) and with 1 part of a cobalt octoate solution.

The solution gelled within 30 minutes and hardened in 24 hours into glass-clear, slightly brown masses.

Example 11

Twenty-one (21) parts of diallylidene pentaerythritol, 22 parts itaconic acid diglycol ester and 0.4 part boron trifluoride etherate were stirred for 3 hours at 60° C. The slightly brown resin so obtained was dissolved in 20 parts of styrene.

After the addition of 0.6 part of methyl ethyl ketone peroxide and 0.3 part of a cobalt octoate solution, the mixture hardened into slightly brown, clear masses.

Example 12

Two tenths (0.2) part of boron trifluoride was stirred into a solution of 27 parts of diallylidene pentaerythritol in 25 parts of maleic acid diglycol ester and 5 parts diethylene glycol and the solution was subsequently heated for 8 hours to 60° C. Fifty parts of the resin formed was dissolved in 40 parts of styrene and mixed with 1 part methyl ethyl ketone peroxide and 0.5 part cobalt octoate solution.

Several glass fiber mats were soaked with this resin solution and then pressed together cold into a form. The casting removed from the form after 30 minutes hardened at room temperature in 48 hours into a hard, resistant plate.

Example 13

With the same resin solution disclosed in Example 12, a cotton fabric was soaked and pressed together cold in several layers. After 14 hours at a temperature of 30° C., hard, resistant plates were obtained.

Example 14

Twenty (20) parts of the resin solution disclosed in Example 12 were stirred with 20 parts of pulverulent silicon carbide and cast in forms. The mass solidifies in a few hours into a very hard, smooth formed body.

Example 15

Twenty-five (25) parts of maleic acid digylcol ester, 26 parts diallylidene pentaerythritol and 0.2 part of boron trifluoride etherate were stirred together and heated for 5 hours at 65° C. The viscous, slightly brown resin was dissolved in 20 parts of styrene and stirred with 3 parts of methyl ethyl ketone peroxide and with 1.5 parts of cobalt octoate solution.

The solution so obtained was painted on glass plates and polymerized within 20 hours at 30° C. into solid (or firm) lacquer films which could be polished.

Example 16

Fifty-three (53) parts of diallylidene pentaerythritol were dissolved in 51 parts of maleic acid diglycol ester, mixed with 0.4 part boron trifluoride etherate and heated at 60° C. for about 5 hours until the OH— number fell between 80 and 100.

(a) Upon the brown, clear and strongly viscous resin being dissolved in 40 parts commercial styrene, gelling took place at 20° C. after 3 to 4 hours and, at 60° C., already after a few minutes.

(b) When the same, brown resin solution was mixed with 0.15 g. sodium methylate dissolved in 1.2 ml. methanol, the resin brightened up to a slightly yellow color tone. When it was then dissolved in 40 parts of commercial styrene, the solution so obtained remained stable for months and did not show any inclination to gel.

Example 17

Ninety-five (95) parts of maleic acid diglycol ester, 100 parts diallylidene pentaerythritol and 0.8 part p-toluene sulfonic acid were mixed together and heated for five hours to 60° C. Then to the strongly brown, viscous resin 0.41 part of morpholine was added whereby a brightening towards a light-brown occurred. After thorough mixing, the resin together with 0.02 part of 3-isopropyl benzcatechin as a polymerization inhibitor were dissolved in 70 parts styrene. The solution so obtained was stable and after 8 months remained unchanged. Without the addition of the morpholine, in spite of the presence of the polymerization inhibitor, gelling occurred already after 10 to 14 hours.

Example 18

Sixty-two (62) parts of maleic acid diglycol ester, 63 parts of phthalic acid diglycol ester, 110 parts of diallylidene pentaerythritol and 0.9 part of boron trifluoride etherate were stirred for 3 hours at 70° C. Then 0.34 part of sodium methylate, dissolved in 1.4 part methanol were added whereupon the highly viscous, brown resin became pale yellow. After cooling to room temperature, the resin was dissolved in 126 parts of styrene. 100 parts of this solution were stirred in with 2 parts of methylethylketone peroxide (40% in dimethyl phthalate) and with 1 part of a cobalt octoate solution (1% cobalt content) and then poured into molds. Gelling set in within one hour and after 24 hours one obtained hard and firm molded bodies.

Example 19

250 parts of an esterification product, having an acid number of 30 and a hydroxyl number of 250 and having been obtained from 4 equivalents of ethylene glycol and a mixture of 2 equivalents of maleic anhydride and 1 equivalent of phthalic anhydride, 118 parts of diallylidene pentaerythritol and 1.3 parts of boron trifluoride etherate were brought to reaction through stirring for 5 hours at 55° C. The highly viscous middle shade grown resin was then neutralized at room temperature with 0.5 part of sodium methylate (dissolved in 2.4 part methanol), and 70 parts thereof dissolved in 30 parts of styrene. After addition of 1 part of a methyl ethyl ketone peroxide solution and of 0.5 part of a cobalt octoate solution, gelling set in after 12 minutes accompanied by strong exothermic heat. Within 20 hours molded articles hardened to very hard and clear bodies.

Example 20

120 parts of an esterification product of 1.2 equivalents of ethylene glycol and 1 equivalent of a mixture of maleic anhydride and adipic acid (mol ratio of acids 9:1, acid number of ester 35, hydroxyl number 270) were reacted for 5 hours at 65° C. with 65 parts of diallylidene pentaerythritol and 0.65 part of boron trifluoride etherate. A highly viscous, middle shade brown resin resulted, which brightened after addition of 0.25 part of sodium methylate to a light yellow. 60 parts of this resin were dissolved in 40 parts of styrene and polymerization was induced by addition of 0.6 part of a methyl ethyl ketone peroxide solution and 0.3 part of a cobalt octoate solution. One obtained, after a few hours, hard clear and almost colorless molded bodies.

Example 21

117 parts of diallylidenepentaerythritol, 110 parts of maleic acid bis-(ethylene glycol) ester having an OH— number of 320 and an acid number of 10, and 6 parts of allyl alcohol were well mixed with 0.43 parts of boron trifluoride etherate and were stirred for 6 hours at 60° C. The brown, strongly viscous resin (OH— number 100) was then mixed with 0.17 part of sodium methylate and dissolved in 125 parts of styrene. 100 parts of this solution were stirred in with 4 parts of methyl ethyl ketone peroxide solution (40 percent in dimethylphthalate) and 2 parts of a cobalt octoate solution (1% cobalt content) and applied to wood in thin layers. Polymerization set in at room temperature after about 8 minutes and resulted after a few hours in a hard, non-sticking coating.

*Example 22*

60 parts of fumaric acid bis(ethylene glycol)ester, 64 parts of diallylidene pentaerythritol and 6 parts of allyl alcohol were stirred together with 0.29 part boron trifluoride etherate for 4 hours at 70° C. 0.11 part of sodium methylate was then added to the resulting polyadduct which had an OH— number between 90 and 100, and the mass dissolved in 70 parts styrene and induced polymerization by adding 8 parts of cyclohexanone peroxide (50% in dimethylphthalate) and 4 parts of cobalt octoate solution. Thinly applied films were, after only 4 hours at room temperature, hard and non-sticking.

*Example 23*

(a) 56 parts of diallylidene pentaerythritol, 50 parts of a mixed maleic-fumaric acid glycol ester, which contained per 4 molar units of ethylene glycol 1 molar unit of maleic acid and 1 molar unit of fumaric acid, 6 parts of allyl alcohol and 0.43 part of boron trifluoride etherate were left to react for 6 hours at 60° C. The highly viscous, dark brown resin (OH— number between 80 and 90) was then mixed with 0.17 part sodium methylate, resulting in considerable brightening to a pale yellow, and was, after cooling off to room temperature, dissolved in 77 parts of styrene which contained 0.02 part hydroquinone. Polymerization was triggered, as in Example 20, with methyl ethyl ketone peroxide—and cobalt octoate—solution. Gelling began at room temperature after about 10 minutes. A thinly applied film dried after 5 hours and became hard and non-sticking.

(b) The same batch yielded, after the addition of an agent reducing the surface tension (for instance 2 parts of a 1% styrene solution of a phenyl-methyl silicon resin having at 20° C. a viscosity between 225 and 300 centipoises (Bayer PL) and having been applied in a thin layer, within a few hours a film of great smoothness and glossy surface.

*Example 24*

35 parts of an esterification product of 1.2 equivalents of ethylene glycol with 1 equivalent of maleic anhydride (acid number 15, hydroxyl number 275), 3.5 parts of an esterification product of 1.2 equivalents of diethylene glycol with 1 equivalent of maleic anhydride (acid number 20, hydroxyl number 220), 28 parts diallylidene pentaerythritol and 3 parts allyl alcohol were stirred, under addition of 0.27 part of boron trifluoride etherate, for 7 hours at 60° C. The strongly viscous, dark brown resin (OH— number between 80 and 85) was then mixed with 0.11 part sodium methylate and, after cooling to room temperature, dissolved in 37 parts of styrene. After thorough mixing with 4 parts of a methyl ethyl ketone peroxide solution and with 2 parts cobalt octoate solution, the solution was applied in a thin film. Gelling set in after 15 minutes and only two hours later the films were non-sticking and dry.

*Example 25*

37 parts of a maleic acid-phthalic acid-glycol ester (mol ratio maleic:phthalic acid 3:1, acid number 20, hydroxyl number 250, ratio of glycol:acid=1.25:1), 2.5 parts of allyl alcohol, 25 parts of diallylidene pentaerythritol and 0.25 part of boron trifluoride etherate were heated for 6 hours to 65° C., to yield a resin of an OH— number between 75 and 85, thereafter neutralized with 0.1 part of sodium methylate, dissolved in 35 parts styrene and stabilized with 0.01 part of hydroquinone. To induce polymerization, this solution was stirred in with 2 parts of a cobalt octoate solution and 4 parts of a cyclohexanone peroxide solution. The lacquer films thus obtained became hard and non-sticking after a few hours.

*Example 26*

50 parts of the maleic acid-phthalic acid-glycol ester of Example 25, 2.5 parts of allyl alcohol and 32 parts of diallylidene pentaerythritol were reacted with each other, under the addition of 0.34 part of boron trifluoride etherate for 5 hours at 60° C. The brown, highly viscous resin (OH— number between 95 and 105) was stirred in with 0.13 part of sodium methylate and 0.015 part of hydroquinone, and then dissolved in 45 parts of styrene. The polymerization was triggered through the addition of 4 weight percent of a methyl ethyl ketone peroxide solution and of 2 weight percent of a cobalt octoate solution. Thin coatings which were applied to rust-free sheet metal dried through within 5 hours at room temperature to become non-sticking.

*Example 27*

(a) 60 parts of maleic acid bis(ethylene glycol)ester, having an acid number of 30 and an OH— number of 280, 52 parts of diallylidene pentaerythritol and 0.45 part of boron trifluoride etherate are stirred for four hours at 55° C. During this procedure the viscosity of the initially yellowish oily liquid is increased and the color turns to yellow-brown. Then 8 parts of methyl-dichloro-silane are added at room temperature within ten minutes to the polyadduct, which has an OH— number between 110 and 120. Heat and hydrogen chloride are evolved during this procedure. After completion of the reaction the mixture is once more heated for 30 minutes to 60° C.

(b) Gaseous portions contained in the mixture are evaporated therefrom at a reduced pressure of less than 100 mm. of mercury. 60 parts of the product thus obtained are dissolved in 40 parts of styrene resulting in a clear, almost colorless solution. When adding one part of a solution of methyl ethyl ketone peroxide in dimethylphthalate (of 40% concentration) and 0.5 part of a cobalt octoate solution (cobalt content 1%), the mixture gels after 50 minutes. By heating for one hour to 80° C. a hard, almost colorless mass is obtained. When the polymerization is carried out at room temperature the hardening requires a longer time.

(c) If the same amount of the reaction product is dissolved in 40 parts of methyl methacrylate, and 2 parts of the methyl ethyl ketone peroxide solution and 1 part of the cobalt octoate solution are added thereto, the mixture is polymerized within ten hours to yield a hard transparent mass.

(d) parts of the resin mixture as prepared according to item (a) are admixed with 40 parts of pulverulent silicon carbide and 20 parts of styrene, then with 1 part of cyclohexanone peroxide and 0.5 part of the cobalt octoate solution of item (b). The resulting mixture is cast and solidifies within a few hours to yield a hard, even shaped body.

*Example 28*

76 parts of an ester obtained from 6 mols of ethylene glycol, 3 mols of maleic acid and 1 mol of phthalic acid and having an acid number of 15 and an OH— number of 300 are reacted with 36 parts of diallylidene pentaerythritol and 0.45 part boron trifluoride etherate within three hours at 70° C. The pale-brown viscous polyadduct formed which has an OH— number between 135 and 140 is reacted as described in Example 27 with 9 parts of methyldichlorosilane. The product is then dissolved in 120 parts of styrene whereby a highly fluid solution is obtained. One part of the methylethylketone peroxide solution and 0.5 parts of the cobalt octoate solution of Example 27b are then stirred into 100 parts of this solution. The mixture is then cast to yield after one day very hard transparent shaped bodies.

The use of boron trifluoride and especially of boron trifluoride etherate has the advantage, that the addition reaction proceeds more rapidly, as in the presence of acid catalysts (e.g. paratoluene sulfonic acid or even boron trifluoride acetic acid), and yet are lighter than color. Accordingly, the temperature at which the addition reaction is carried out, may be reduced which also favors the formation of less colored products. The use of boron trifluoride etherate not only allows a reduction of the reaction temperature by about 20° C., compared with e.g. para-toluene sulfonic acid, but also leads to a marked reduction of the amount of by-products formed. The reason for it is that especially in the presence of allyl alcohol, and at the temperature of the addition reaction the diallylidene pentaerythritol is in part decomposed to acrolein and pentaerythritol, a reaction which does almost not occur in the presence of boron trifluoride etherate and at the temperature required by that catalyst. The acrolein, however, not only causes the formation of undesired by-products, but is also a toxic substance.

Generally, the boron trifluoride etherate need only be used in an amount of 10 percent of the weight of e.g. para-toluene sulfonic acid.

Those skilled in the art to which this invention appertains will recognize that the foregoing general disclosure and specific examples are merely exemplary and that the specified reactants, reaction conditions, and other process details may be varied widely and still fall within the spirit of the invention taught herein and within its scope as defined in the appended claims.

What is claimed is:

1. In the process of producing a polyadduct by intimately admixing (A) an ester of at least one saturated aliphatic polyhydric alcohol and at least one dicarboxylic acid selected from the group consisting of (1) $\alpha,\beta$-ethylenically unsaturated dicarboxylic acids and (2) mixtures thereof with up to an equimolecular amount of at least one saturated dicarboxylic acid, said ester containing free excess alcholic hydroxy groups and having an acid number between 5 and 50 and a hydroxyl number between 200 and 350, and (B) diallylidene pentaerythritol in a molar ratio of A:B between 0.3:1 and 3:1 with (C) a catalytic amount of a catalyst to yield a polyadduct, the improvement which comprises reacting the diallylidene pentaerythritol with a mixture of the ester (A) and allyl alcohol in which the allyl alcohol is contained in an amount equaling about 1 to 25% of the weight of A+B and stabilizing the resulting polyadduct against gelling by a small quantity of a basic reacting substance.

2. A process as claimed in claim 1, wherein the catalyst (C) is boron trifluoride etherate.

3. In the process for producing a resin polymer by intimately admixing (A) an ester of at least one saturated aliphtic polyhydric alcohol and at least one dicarboxylic acid selected from the group consisting of (1) $\alpha,\beta$-ethylenically unsaturated dicarboxylic acids and (2) mixtures thereof with up to an equimolecular amount of at least one saturated dicarboxylic acid, said ester containing free excess alcoholic hydroxy groups and having an acid number between 5 and 50 and a hydroxyl number between 200 and 350, and (B) diallylidene pentaerythritol in a molar ratio of A:B between 0.3:1 and 3:1 with (C) a catalytic amount of a catalyst to yield a polyadduct, and copolymerizing the polyadduct thus obtained with a normally liquid polymerizable monomer having the group $>C=CH_2$ and containing from 3 to 16 carbon atoms, the improvement which comprises reacting the diallylidene pentaerythritol with a mixture of the ester (A) and allyl alcohol in which the allyl alcohol is contained in an amount equaling about 1 to 25% of the weight of A+B and stabilizing the resulting polyadduct against gelling by a small quantity of a basic reacting substance.

4. The process as claimed in claim 3, wherein said ester and diallylidene pentaerythritol are applied in a molar ratio between 0.5 to 1 and 2 to 1 and wherein the amount of allyl alcohol equals about 5 to 15% of the weight of A+B.

5. The composition of claim 1.

6. A composition produced by the process of claim 1, wherein the ratio of A:B is between 0.5:1 and 2:1 and the weight of the allyl alcohol component is about 5 to 15% of the weight of A+B.

7. The readily hardenable resin composition of claim 3.

8. A rapidly hardenable resin composition produced by the process of claim 3, wherein the ratio of A:B is between 0.5:1 and 2:1 and the weight of the allyl alcohol component is about 5 to 15% of the weight of A+B.

9. A readily hardenable resin composition as claimed in claim 8, wherein said polymerizable monomer is styrene.

10. A hard copolymer resin obtained by catalytically hardening the composition of claim 3.

11. A hard copolymer resin, as claimed in claim 10, wherein the ratio of A:B is between 0.5:1 and 2:1 and the weight of the allyl alcohol component is about 5 to 15% of the weight of A+B.

12. A hard copolymer resin comprising a copolymerization product of (I) a normally liquid polymerizable monomer having the group $>C=CH_2$ and containing from 3 to 16 carbon atoms and (II) a resinous polyadduct of 0.5 to 2 mols of diallylidene pentaerythritol with 1 mol of an ester of at least 1 saturated aliphatic polyhydric alcohol with an ester-forming component of at least 1 dicarboxylic acid selected from the group consisting of (1) $\alpha,\beta$-ethylenically unsaturated dicarboxylic acids and (2) mixtures thereof with up to an equal molar amount of at least one saturated dicarboxylic acid, said ester containing free excess alcoholic hydroxy groups, and (III) allyl alcohol in an amount equalling about 5 to 15% of the weight of (I)+(II), the said polyadduct component having been further modified by a reaction with 5 to 15%, calculated on the weight of the polyadduct, of at least one halosilane selected from the group consisting of alkyl and aryl halosilanes.

13. In the process for producing a resin polymer by intimately admixing (A) an ester of at least one saturated aliphatic polyhydric alcohol and at least one dicarboxylic acid selected from the groups consisting of (1) $\alpha,\beta$-ethylenically unsaturated dicarboxylic acids and (2) mixtures thereof with up to an equimolecular amount of at least one saturated dicarboxylic acid, said ester containing free excess alcoholic hydroxy groups and having an acid number between 5 and 50 and a hydroxyl number between 200 and 350, and (B) diallylidene pentaerythritol in a molar ratio of A:B between 0.5:1 and 2:1 with (C) a catalytic amount of a catalyst to yield a polyadduct, and copolymerizing the polyadduct thus obtained with a normally liquid polymerizable monomer having the group $>C=CH_2$ and containing from 3 to 16 carbon atoms, improvements which comprise reacting the diallylidene pentaerythritol with a mixture of the ester (A) and allyl alcohol in which the allyl alcohol is contained in an amount equalling about 5 to 15% of the weight of A+B, and reacting the polyadduct having an OH— number in the range from 110 to 140 with 1 to 25%, calculated on the weight of the polyadduct, of at least one halosilane selected from the group consisting of alkyl and aryl halosilanes, before said copolymerization is effected.

14. A readily hardenable liquid resin composition comprising a solution of a polyadduct in a normally liquid polymerizable monomer having the group $>C=CH_2$ and containing from 3 to 16 carbon atoms, said polyadduct being a reaction product of (A) 0.5 to 2 moles of diallylidene pentaerythritol with one mol of (B) an ester of at least one saturated aliphatic polyhydric alcohol containing free excess alcoholic hydroxy groups, wherein the other component of the ester is an ester-forming component of at least one dicarboxylic acid selected from the group consisting of (1) α,β-ethylenically unsaturated dicarboxylic acids and (2) mixtures thereof with up to an equal molar amount of at least one saturated dicarboxylic acid, and (C) allyl alcohol in an amount equalling about 5 to 15% of the weight of $A+B$, the said polyadduct having been modified by a reaction with 1 to 25%, calculated on the weight of the polyadduct, of at least one halosilane selected from the group consisting of alkyl and aryl halosilanes, and said hardenable liquid resin composition being stabilized against gelling by a small quantity of an alkaline-reacting compound.

References Cited by the Examiner

UNITED STATES PATENTS

| | | | |
|---|---|---|---|
| 2,524,921 | 10/1950 | Minter | 260—861 |
| 2,852,487 | 9/1958 | Maker | 260—57 |
| 2,870,121 | 1/1959 | Kraft | 260—67 |
| 2,974,116 | 3/1961 | Parker et al. | 260—873 |

FOREIGN PATENTS

| | | |
|---|---|---|
| 855,165 | 11/1952 | Germany. |
| 757,573 | 9/1956 | Great Britain. |
| 529,338 | 6/1955 | Italy. |

SAMUEL H. BLECH, *Primary Examiner.*

LEON J. BERCOVITZ, MURRAY TILLMAN,
*Examiners.*